Patented June 9, 1942

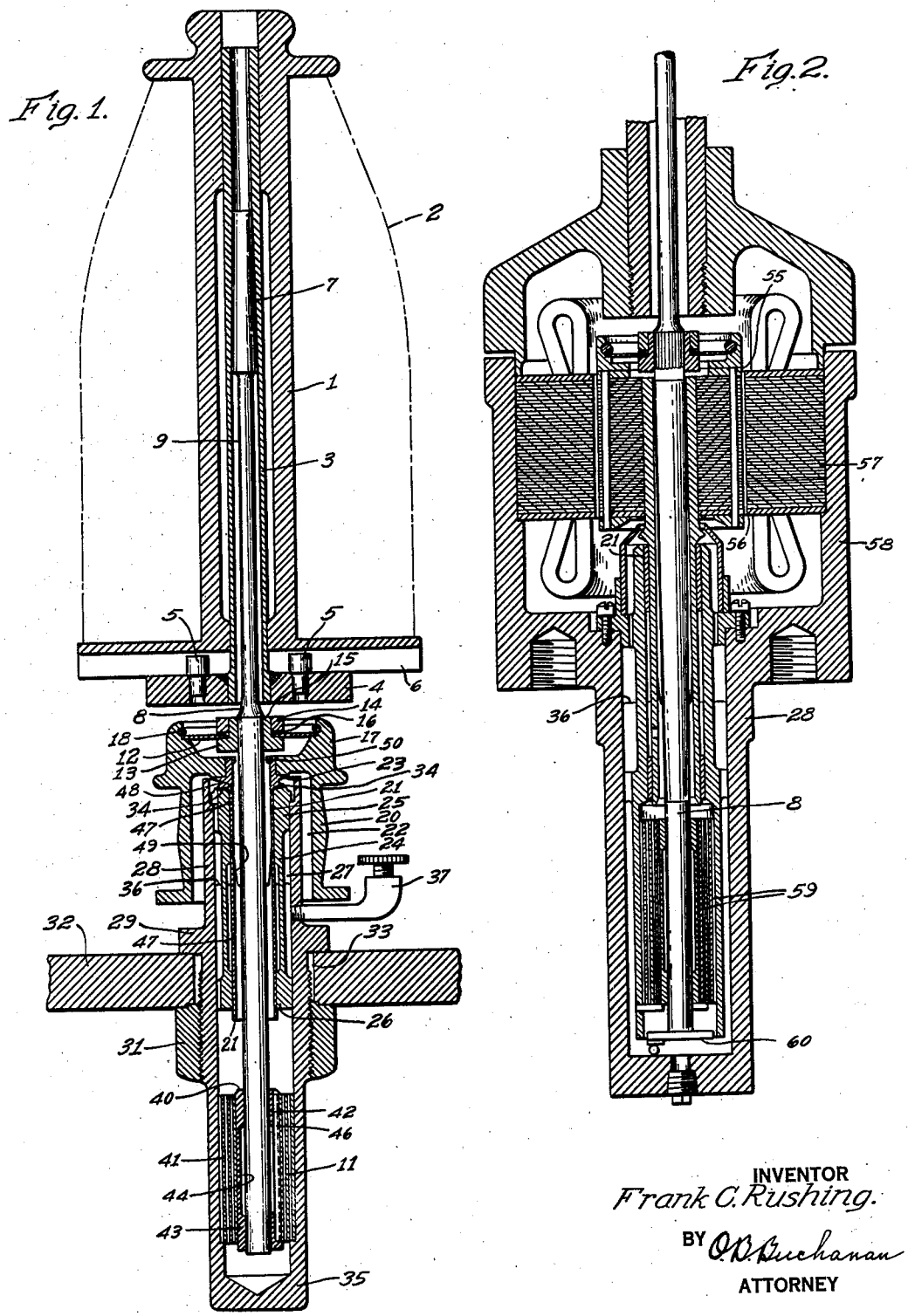

2,285,681

UNITED STATES PATENT OFFICE 2,285,681

ROTATING ASSEMBLY

Frank C. Rushing, Pittsburgh, Pa., assignor to Westinghouse Electric & Manufacturing Company, East Pittsburgh, Pa., a corporation of Pennsylvania Application April 30, 1941, Serial No. 391,086

16 Claims. (Cl. 308—152)

My invention relates to rotating assemblies, particularly high-speed assemblies such as are utilized in spinning-operations, or in twisting thread, and high-speed apparatus for other purposes. It has particular relation to a high-speed flexible-shaft assembly which is driven above its critical speeds, and in which the flexible shaft or spindle is laterally restrained, at one point, by a diaphragm which substantially prevents lateral movement but which permits a slight tilting movement or angular displacement of the flexible shaft, the outer rim of the diaphragm being carried by a hollow-shaft or quill-type rotor-motor which is supported in stationary, non-tilting bearings, the bottom end of the flexible shaft being rotatably mounted within a damping means which permits a certain amount of radial displacement with damping.

My invention is particularly adapted for high-speed apparatus, although it is not necessarily limited thereto. It has particularly to do with applications in which it is desirable to prevent the pounding forces resulting from the rotation of an unbalanced mass from being transmitted, in any substantial degree, to the bearings in which the rotating device is mounted, and through the bearings to the support or foundation on which the device rests. In order to prevent a strong bearing-reaction from the whipping action of strong centrifugal forces due to the rapid rotation of an unbalanced mass, it has been common, in some instances, to support the mass on a flexible shaft and to so choose the masses, inertias, flexibilities and moments that the critical vibration-rates of the vibrating or whipping will be considerably less than the operating speed at which the device is normally operated, thereby providing an assembly in which only an extremely small part of the whipping-forces is transmitted to the bearings, as the result of the relatively small forces needed to slightly bend or flex the flexible shaft. In order to enable the apparatus to operate at its critical speeds, if desired, or to safely pass through its critical speeds, in accelerating and decelerating to and from its normal operating speed, or to prevent self-excited vibrations, at some natural frequency, when operating at a higher operating-speed, it is necessary to provide damping-means which is effective, at the critical speeds, to reduce the momentary amplitudes of vibration as the device passes through these speeds, on being started up.

My present invention is an improvement over the rotating assembly which is shown in the Baker et al. Patent 2,147,420, issued February 14, 1939, and assigned to the Westinghouse Electric & Manufacturing Company. In the rotating assembly shown in said patent, the rotor-member by which the rotating parts were driven, and the guide-bearings in which said rotor-member was supported, were tiltably mounted, so that, when the apparatus passed through its critical speeds, the rotor-member and its bearings could tilt slightly about a point near one end thereof, while its other end moved laterally within a damping means.

It is an object of my present invention to provide an arrangement in which the rotor-member by which the rotating apparatus is driven is non-tiltably or rigidly mounted, in guide-bearings which are rigidly supported against tilting or angular movement as well as against translatory movement, thus avoiding certain difficulties which have been attendant upon the use of the tiltable-rotor design. I accomplish this purpose by causing the flexible shaft or spindle to pass through a hollow core in the center of the rotor-member and the rotor-bearings, without touching the same, and without being restrained in any manner by the same, except at a single intermediate point, where a diaphragm, or the equivalent, restrains the spindle against radial or lateral translation, while permitting the axis of the spindle to move angularly at this point; one end of the spindle, such as the bottom end, being stayed by a damping-means which permits some radial movement, but damps said radial movement, at said end.

A further object of my invention is to provide a rotor-member which is rigidly supported against all movements except rotation, that is, prevented from moving laterally or axially or angularly, in combination with a flexible-shaft system having a relatively large mass at one end, where unbalance is likely to occur, and having a relatively small mass at the other end, where a damping means is provided, with such relative proportions of the masses, inertias, moments and flexibilities as to provide a vibratory system having a natural frequency which can be adjusted, over a wide range, by properly choosing the design-constants of the system, and to cause said natural frequency to be relatively independent of the mass or the amount of unbalance of the rotated body. By this means I have been able to provide a rotating system which will handle much larger amounts of unbalance than heretofore, or to handle the same amount of unbalance at much higher speeds of operation; and I am also enabled, because of the substantially constant natural frequency, to utilize a damping-device which has a range of maximum effectiveness in the neighborhood of said natural frequency and which is thus more effective than a damping device which must be designed to be operable over a wider range of frequencies.

With the foregoing and other objects in view, my invention consists in the apparatus, combinations, parts, systems and methods hereinafter described and claimed, and illustrated in the accompanying drawing, wherein Figure 1 is a longitudinal vertical sectional view of a belt-driven bolster for a high-speed thread-twisting apparatus, embodying my invention in a preferred form of embodiment, the horizontal dimensions being somewhat exaggerated, relative to the vertical dimensions, for clarity of illustration, and Fig. 2 is a similar view of a spinning-motor assembly, embodying my invention, with certain parts broken away for clarity of illustration, the omitted parts being the same as the corresponding portion of Fig. 1.

Fig. 1 shows a belt-driven bolster for supporting a pirn 1, or unloaded shell or spool which is rotated at high speed in the process of twisting thread which is wound thereon to form a package 2. The pirn 1 is mounted on an adaptor 3 which may be provided with an enlarged mass 4 on its lower end, in a manner similar to that described in the Baker et al. patent. The lower flange or mass 4 of the adaptor is provided with driving-pins 5 which enter into a keying groove or grooves 6 in the bottom of the pirn for causing the pirn to rotate with the adaptor. The adaptor 3 is mounted on the tapered top end 7 of a long vertical flexible shaft or spindle 8, the upper portion of which, just below its tapering top end 7, is of reduced diameter, as indicated at 9, for the purpose of providing more flexibility at this portion of the spindle.

The spindle 8 must be restrained against radial or lateral movement or translation at some intermediate point, but it must also be so mounted that it has some small freedom of angular movement or adjustment at this point, so that the lower end of the spindle may move laterally in a damper 11 which will be subsequently described. In accordance with my invention, the lateral restraint of the spindle 8, at an intermediate point, is provided by a diaphragm 12 or other equivalent means for substantially preventing radial movement of the spindle at this point, while permitting a certain amount of hinging movement or angular deflection. The diaphragm 12 may be made of clock-spring steel, or it may be any flexible member, not necessarily resilient, although a resilient material is desirable in having a centering influence tending to keep this spindle "centered" or preventing it from tilting over, slightly, in the standstill position of the device. The diaphragm 12 is centered on the spinde 8, at an intermediate point of the latter, by any suitable means, such as two collars 13 and 14, the collar 13 being a hub-like shoulder-collar which is pressed on the spindle 8, and the collar 14 being a clamping-ring which is pressed onto a reduced portion 15 of the hub-collar 13, so as to firmly engage the center of the diaphragm 12 between the two collars. Preferably, some yieldable material 16 is interposed between the two collars, on one or both sides of the diaphragm 12. This yieldable material 16 may be a fishpaper gasket, a spring washer, or any other means which will hold the diaphragm substantially tight on the spindle 8.

The outer rim of the diaphragm 12 is carried by the rotor-member 17 through which the high-speed assembly is driven. Any suitable means may be provided for securing the outer periphery of the diaphragm 12 to the rotor-member 17, the illustrated means including a snap-spring 18 which tightly holds the diaphragm in place, with sufficient friction to provide a non-slipping driving-connection for rotating the spindle 8 from the rotor-member 17, through the diaphragm 12.

In the form of my invention shown in Fig. 1, the rotor-member 17 comprises a belt-pulley 20 which is adapted to be driven by a belt (not shown).

The belt-pulley 20 is mounted on, or integral with, a hollow shaft or quill 21 which surrounds the intermediate portion of the flexible spindle 8 in spaced relation thereto. In the form of construction shown in Fig. 1, the upper portion of the pulley 20, immediately below the diaphragm 12, is joined to the top end of the hollow shaft 21, and the pulley-proper is itself hollow, so as to provide an inverted-cup construction, providing an annular space 22 between the pulley 20 and the top half of the quill 21. Into this annular space 22 projects the top end of a fixed bearing-assembly which will now be described.

The top end of the hollow shaft or quill 21, immediately below the point where the top portion of the hollow pulley 20 is joined to the quill, is enlarged to provide a rotating annular thrust-bearing member or runner 23 which is carried by the rotating hollow shaft 21. Surrounding the hollow shaft 21 underneath the runner 23 is a journal or guide bearing constituting the main bearing 24 of the entire high-speed assembly. The main bearing 24 is in the form of a common cylindrical stationary bearing-housing for an upper main bearing 25 and a lower main bearing 26, with an annular space 27 therebetween.

The main bearing-housing 24 is stationarily supported in a cylindrical supporting-frame 28 which is provided with an external shoulder-member 29 and a nut 31, between which a rigid horizontal supporting-member 32 is clamped, the frame 28 extending through a hole 33 in the support 32.

The upper end of the upper main bearing 25 constitutes a stationary annular thrust-bearing member, the top surface of which cooperates with the bottom surface of the runner 23 to provide a thrust-bearing 34. As described and claimed in a companion-application of Arthur C. Hagg, Serial No. 391,048, filed April 30, 1941, the annular top-surface of the upper main bearing 25 has a small slope toward the center so as to provide a wedge-shaped oil-film between the two thrust-bearing surfaces 34, with the thick part of the wedge toward the hollow shaft 21.

The lower end of the hollow shaft 21 terminates shortly below the lower main bearing 26, but the flexible spindle 8 extends down a considerable distance further, and the cylindrical supporting-frame extends down still further than the spindle 8 and terminates in a closed bottom end 35 which constitutes the bottom of an oil-reservoir, in which oil is maintained at a suitable oil-level 36 at some intermediate point along the height of the hollow shaft or quill 21. An oil-filler 37 is shown, for maintaining the oil-level 36.

The lower end of the spindle 8 has a certain amount of lateral movement or whipping, as the spindle tilts or inclines slightly in its diaphragm 12, under certain transient operating-conditions as will subsequently be described. A combined guide-bearing and damping-means 11 is provided for this lower end of the spindle 8, in the form of a non-rotating damper-bearing 40, which surrounds the spindle near the lower end thereof, and a non-rotating damping-means 41 which surrounds the damper-bearing 40 and nests in the lower end of the cylindrical supporting-frame 28.

The damper-bearing 40 is in the form of a common cylindrical non-rotating bearing housing for an upper damper-bearing 42 and a lower damper-bearing 43, with an annular space 44 therebetween.

The particular form of a damping-means 41 which is shown in Fig. 1 is an improved element more particularly described and claimed in an application of Arthur C. Hagg, Serial No. 391,047, filed April 30, 1941. The damping-means 41 of Fig. 1 comprises a non-rotating, loosely coiled, spirally wound strip surrounding the spindle near the lower end thereof, and comprising a plurality of spaced convolutions. The inner loop of the spiral damper 41 presses against the damper-bearing 40 and may be keyed thereto by means of an axially extending slot 46 in the damper-bearing housing, to prevent rotation of the damper-bearing. The outer loop of the spiral damper 41 presses against the cylindrical supporting-frame 28 with a force which has been found sufficient to prevent rotation of the spiral. The combined damper-bearing 40 and damper 41 is immersed in the oil 36 which is contained in the cylindrical supporting-frame 28. The spirally wound damper-strip 41 may be a mild steel, not necessarily spring-steel, or it may be copper, or it may even be a substantially non-resilient material.

The particular lubricating-means which is shown in Fig. 1 is an improved element which is more particularly described in the first-mentioned Hagg application on the thrust-bearing. The damper-bearing 40, being immersed in oil, requires no further lubrication-means than the natural movement of oil which occurs during the operation of the device. The main bearing 24 is lubricated mainly by one or more oil-ducts 47 through the wall of the hollow shaft 21 at such a height as to discharge oil, under considerable centrifugal pressure, into the annular space 27 between the upper and lower main-bearings 25 and 26, causing oil to pass upward through the upper main-bearing 25 and downward through the lower main-bearing 26.

The thrust-bearing 34 is lubricated by the oil which is discharged from the upper end of the upper main-bearing, and preferably also by a supplemental oiling-means in the form of one or more oil-ducts 48 which may be drilled through the wall of the hollow shaft 21 at about the level of the thrust-bearing 34. These thrust-bearing ducts 48 are above the normal oil-level 36 in the cylindrical supporting-frame 28, and are supplied with oil from an oil-layer or film 49 which climbs up along the inner surface of the hollow shaft 21 by reason of the whirling of the oil caused by the rotation of said hollow shaft. This inner oil-film 49 inside of the hollow shaft 21 may be prevented from discharging out of the upper end of the hollow shaft by means of an annular projection or lip 50 on the inside of the hollow shaft at a height above the oil-ducts 48, for limiting the rise of said film 49 on the inside diameter of the hollow shaft 21.

The operation of the high-speed assembly shown in Fig. 1 is as follows. The horizontal supporting-member 32 firmly holds the vertical cylindrical supporting-frame 28 with rigid restraint against movement of any kind. The main bearings 24, being centered in the cylindrical supporting-frame 28, thus restrain the driving-rotor member against radial lateral-translation and also against tilting movements, said driving-rotor member comprising the hollow shaft or quill 21 and the driving-pulley 20 or other means for imparting a rotating-torque to the flexible spindle 8. The diaphragm 12, being centered in the rotor-member, restrains the flexible spindle 8 from any radial movement or lateral translation at the intermediate point thereof where said diaphragm is attached, but the flexibility of the diaphragm permits the spindle to have a certain amount of tilting-movement about said intermediate point under certain critical-speed conditions, as will now be described.

The high-speed assembly constitutes a spring-system consisting principally of a driven mass to be rotated, mounted on the top end of a flexible spindle which is restrained against lateral translation at an intermediate point, but which has some resiliently restrained freedom of tilting-movements at said intermediate point, a relatively small mass at the lower end of the spindle, and a damping-means near the lower end of the spindle, for permitting the lower end of the spindle to rotate with some freedom of lateral displacement, but damping such lateral displacement, near said lower end. In the form of embodiment shown in Fig. 1, the resilience of the diaphragm 12 and the resilience of the spiral damper 41 also contribute to the spring-system by tending to "center" the spindle in its vertical, non-tilted position.

In this spring-system, the driven mass, which is rotated or to be rotated, at a high speed, at the top of the flexible spindle 8, consists of a non-varying portion in the form of the adapter 3, which is in place on the spindle under all normal operating-conditions of the high-speed assembly, and a variable-mass portion in the form of the detachable pirn 1 and a variable amount of thread 2 which is contained thereon in various stages of the thread-twisting operation. The package consisting of the pirn 1 and thread 2 is subject to a certain amount of uncontrollable and variable unbalance, which tends to produce a whipping of the spindle 8, and a centrifugal force-reaction in the main bearings 24; and it is the principal object of my invention to prevent any considerable part of these force-reactions from being transmitted to the main bearings 24, and through them to the supporting-structure 32.

The spindle 8 is preferably, although not necessarily, of a reduced diameter between the diaphragm 12 and the adapter 3, as indicated at 9, so as to be more flexible in this portion than at the lower end between the diaphragm 12 and the damper 41.

The spring-system just described is subject to several modes of vibration, each having a natural vibration-rate at which the amplitude of vibration is the greatest. The principal modes of vibration may be described as follows.

As pointed out in the Baker et al. patent, the spring-system has a natural frequency associated with translatory motion of the driven mass, this natural frequency varying directly as the square root of the spring-constants of the spindle, and varying inversely as the square root of the mass. This natural frequency increases when the adaptor is unloaded, because of its inverse dependence upon its square root of the driven mass. The design is such, however, that even when the pirn 1 is removed from the adaptor 3, the natural frequency associated with translation of the adaptor 3 is still well below the operating speed of the high-speed mechanism.

As further set forth in the Baker et al. patent, the spring-system would also have a natural frequency of vibration, involving mainly angular motion of the driven mass comprising the package 1—2 and the adaptor 3, if the bottom end of the spindle were assumed to be restrained against lateral motion. This natural frequency would vary directly as the angular spring-constant of the spindle, and it would vary inversely with the square root of the effective inertia of the driven mass, which is the difference between the horizontal and vertical inertias of the driven mass with respect to a horizontal diameter or axis passing through the center of gravity of the driven mass, and a vertical diameter or axis coincident with the center-line of the spindle, respectively. The adaptor 3 is long enough, axially, so as to bring down this angular natural frequency to a value in the neighborhood of the natural frequency involving mainly translation.

Instead of the last-mentioned natural frequency involving mainly angular deflection of the driven mass, the spring-system, at least at speeds where the damper is the most effective, actually has a natural frequency involving mainly angular motion of the bottom end of the spindle 8, moving substantially about the center of the diaphragm 12, said motion involving a lateral displacement of a composite mass comprising the combined damper-bearing and damping-means 11, and the mass of the portion of the spindle 8 below the diaphragm 12. In this mode of vibration of the spring-system, the upper or driven mass 1—2—3 is relatively only slightly movable (except for its rotation about a substantially fixed axis), while the bottom end of the spindle oscillates with a relatively larger angular movement about the center of the diaphragm as a pivot, with the spindle flexing between the diaphragm and the upper mass. In my design, the lower mass is considerably smaller than the upper mass, so that there is a strong tendency for the lower mass to move, while the upper mass remains relatively stationary (except for its rotation), so that the natural frequency of the spring-system, involving angular motion, is largely determined by the lower mass and by its turning-moment with respect to the intermediate, laterally fixed point determined by the diaphragm. For example, when the effective inertia of the upper or driven mass is multiplied four times, the natural frequency of oscillation associated with angular movement is decreased only about 10%, instead of being reduced to one-half of its former value, as would be the case in a spring-system in which the lower end of the spindle was prevented from tilting, and the angular movement was obtained only at the upper mass 1—2—3. The natural frequency of vibration involving mainly the angular motion of the lower end of the spindle is so chosen, by a proper choice of the masses and angular spring-constant, that it is considerably lower than the operating speed of the mechanism.

The function of the damping-means, near the bottom end of the spindle, is to permit the spindle to oscillate by a tilting movement about the point fixed by the diaphragm, but to absorb energy from such oscillation, or dampen such oscillation, the damping being obtained by the friction due to the viscosity of the oil which is squeezed between the convolutions of the spiral damper during the angular movement. Since the natural frequency of oscillation of the spring-system is substantially independent of the effective inertia and mass of the rotated body at the top of the spindle, over the possible variation in range, the design of the damping-means is considerably simplified, as it is required to provide effecting damping at only a comparatively narrow range of natural frequencies or shaft-speeds.

At speeds considerably higher than the effective damping-speed of the damping-means, the damping-means opposes a relatively very great resistance to any movement of the lower end of the spindle, thus acting substantially like a rigid support for the lower end of the spindle at the operating speed of the high-speed assembly. Since, however, the operating speed is considerably higher than any natural frequency of vibration of the spring-system, the only reaction felt at the diaphragm and at the damper-bearing during the normal operation of the high-speed assembly is the relatively slight force necessary to bend the flexible spindle slightly, so that practically no vibratory force is transmitted to the main bearings 24, or through them to the supporting-structure 32.

In Fig. 2, I show my invention in a form of embodiment in which the rotating torque is supplied by a high-frequency squirrel-cage electric motor. The essential difference between Fig. 2 and Fig. 1 is that belt-pulley 20 of Fig. 1 is replaced, in Fig. 2, by the rotor-member 55 of the motor. The motor-rotor 55 operates within a small air-gap 56 between itself and the stator-member 57 of the motor, the latter being mounted in an enlarged portion 58 of the cylindrical supporting-frame 28.

In Fig. 2, also, I show the old type of damping-means, consisting of a plurality of nested cylinders 59, such as are shown in the previously mentioned Baker et al. patent.

In Fig. 2, also, I have illustrated a thrust-bearing 60 for supporting the lower end of the spindle 8.

While I have shown my invention in two preferred forms of embodiment, both of them high-speed rotating assemblies operating at a speed of the order of 10,000 R. P. M., my invention is not limited to these forms or to such a speed. Thus, a similar construction, with proper choice of constants, could be utilized, for example, in a centrifuge construction, operating at a slow speed such as 500 R. P. M., where pounds of unbalance may be taken care of, against ounces at the higher speed. The pirn, also, could take the place of the adapter, provided that it had the proper inertia characteristics. These and other changes may be made within the scope of my invention, as will be understood by those skilled in the art. I desire, therefore, that the appended claims be given the broadest construction consistent with their language.

I claim as my invention:

1. A rotating assembly comprising a flexible spindle having means, near one end, for the attachment of a driven mass to be rotated, a driving-quill assembly surrounding an intermediate portion of said spindle in spaced relation thereto, bearing-means for said quill, a supporting frame for rigidly supporting said bearing-means, said supporting-frame having mounting-means for substantially rigidly restraining it against both radial translatory movement and angular tilting, said driving-quill assembly comprising a rotor-member for applying a driving-torque, said driving-quill assembly further comprising a spindle-driving and guiding means for the driving attachment of one portion of the quill-assembly to an intermediate portion of the spindle with some freedom of tilting movement of the spindle but with substantial restraint against radial lateral-translation of the spindle at said intermediate portion thereof, and a combined bearing-means and damping-means, surrounding the spindle near the other end thereof, for permitting the spindle to rotate with some freedom of lateral displacement, but damping such lateral displacement, near said other end.

2. The invention as defined in claim 1, characterized by the driven mass comprising a non-varying portion which is the same under all normal operating-conditions of the rotating assembly and a variable portion which varies as to mass and the degree of unbalance under different operating-conditions of the assembly, and further characterized by such interrelations between the effective masses and inertias of the driven mass under all operating conditions, the effective mass of the combined bearing-means and damping-means at the other end of the spindle, the distances of these masses from the intermediate laterally-restrained portion of the spindle, and the flexibility of the spindle, that the natural frequency involving mainly angular motion of the driven mass, the natural frequency involving mainly translation of the driven mass, and the natural frequency involving mainly angular motion of the other end of the spindle, moving substantially about said intermediate portion of the spindle, are all well below the operating-speed of the rotating assembly.

3. The invention as defined in claim 1, characterized by the driven mass comprising a non-varying portion which is the same under all normal operating-conditions of the rotating assembly and a variable portion which varies as to mass and the degree of unbalance under different operating-conditions of the assembly, and further characterized by such interrelations between the flexibility of the spindle and the inertia characteristics of the driven mass and the combined bearing-means and damping-means at the other end of the spindle, the driven mass being the larger, that the principal natural frequencies of vibration of the resilient system are fairly constant throughout a considerable range of variation in the mass of the driven mass, said principal natural frequencies of vibration having a range of values which is well below the operating-speed of the assembly.

4. The invention as defined in claim 1, characterized by the driven mass comprising a non-varying portion which is the same under all normal operating-conditions of the rotating assembly and a variable portion which varies as to mass and the degree of unbalance under different operating-conditions of the assembly, and further characterized by such interrelations between the flexibility of the spindle and the inertia characteristics of the driven mass and the combined bearing-means and damping-means at the other end of the spindle, the driven mass being the larger, that the natural frequency involving the angular movement of the spindle about its laterally restrained intermediate portion is fairly constant throughout a considerable range of variation in the effective inertia of the driven mass and is well below the operating-speed of the assembly.

5. A rotating assembly comprising a flexible spindle having means, near one end, for the attachment of a driven mass to be rotated, a driving-quill assembly surrounding an intermediate portion of said spindle in spaced relation thereto, bearing-means for said quill, a supporting-frame for supporting said bearing-means, said driving-quill assembly comprising a rotor-member for applying a driving-torque, said driving-quill assembly further comprising a spindle-driving and guiding means for the driving-attachment of one portion of the quill assembly to an intermediate portion of the spindle with some freedom of tilting movement of the spindle but with substantial restraint against radial lateral-translation of the spindle at said intermediate portion thereof, and a combined bearing-means and damping-means, surrounding the spindle near the other end thereof, for permitting the spindle to rotate with some freedom of lateral displacement, but damping such lateral displacement, near said other end.

6. The invention as defined in claim 5, characterized by the driven mass comprising a non-varying portion which is the same under all normal operating-conditions of the rotating assembly and a variable portion which varies as to mass and the degree of unbalance under different operating-conditions of the assembly, and further characterized by such interrelations between the effective masses and inertias of the driven mass under all operating conditions, the effective mass of the combined bearing-means and damping-means at the other end of the spindle, the distances of these masses from the intermediate laterally-restrained portion of the spindle, and the flexibility of the spindle, that the natural frequency involving mainly angular motion of the driven mass, the natural frequency involving mainly translation of the driven mass, and the natural frequency involving mainly angular motion of the other end of the spindle, moving substantially about said intermediate portion of the spindle, are all well below the operating-speed of the rotating assembly.

7. The invention as defined in claim 5, characterized by the driven mass comprising a non-varying portion which is the same under all normal operating-conditions of the rotating assembly and a variable portion which varies as to mass and the degree of unbalance under different operating-conditions of the assembly, and further characterized by such interrelations between the flexibility of the spindle and the inertia characteristics of the driven mass and the combined bearing-means and damping-means at the other end of the spindle, the driven mass being the larger, that the principal natural frequencies of vibration of the resilient system are fairly constant throughout a considerable range of variation in the mass of the driven mass, said principal natural frequencies of vibration having a range of values which is well below the operating-speed of the assembly.

8. The invention as defined in claim 5, characterized by the driven mass comprising a non-varying portion which is the same under all normal operating-conditions of the rotating assembly and a variable portion which varies as to mass and the degree of unbalance under different operating-conditions of the assembly, and further characterized by such interrelations between the flexiblity of the spindle and the inertia characteristics of the driven mass and the combined bearing-means and damping-means at the other end of the spindle, the driven mass being the larger, that the natural frequency involving the angular movement of the spindle about its laterally restrained intermediate portion is fairly constant throughout a considerable range of variation in the effective inertia of the driven mass and is well below the operating-speed of the assembly.

9. A rotating assembly comprising a flexible spindle having means, near one end, for the attachment of a driven mass to be rotated, a rotor-member for applying a driving-torque to the assembly, bearing-means for said rotor-member, a supporting-frame for rigidly supporting said bearing-means, said supporting-frame having mounting-means for substantially rigidly restraining it against both radial translatory movement and angular tilting, a spindle-driving and guiding means for the driving-attachment of one portion of the rotor-member to a second portion of the spindle with some freedom of tilting movement of the spindle but with substantial restraint against radial lateral-translation of the spindle at said second portion thereof, and a combined bearing-means and damping-means, surrounding some other portion of the spindle, for permitting the spindle to rotate with some freedom of lateral displacement, but damping such lateral displacement, at said other portion of the spindle.

10. The invention as defined in claim 9, characterized by the driven mass comprising a non-varying portion which is the same under all normal operating-conditions of the rotating assembly and a variable portion which varies as to mass and the degree of unbalance under different operating-conditions of the assembly, and further characterized by such interrelations between the effective masses and inertias of the driven mass under all operating conditions, the effective mass of the combined bearing-means and damping-means at the other portion of the spindle, the distances of these masses from the second portion of the spindle, and the flexibility of the spindle, that the natural frequency involving mainly angular motion of the driven mass, the natural frequency involving mainly translation of the driven mass, and the natural frequency involving mainly angular motion of the spindle, moving substantially about said second portion of the spindle, are all well below the operating-speed of the rotating assembly.

11. The invention as defined in claim 9, characterized by the driven mass comprising a non-varying portion which is the same under all normal operating-conditions of the rotating assembly and a variable portion which varies as to mass and the degree of unbalance under different operating-conditions of the assembly, and further characterized by such interrelations between the flexibility of the spindle and the inertia characteristics of the driven mass and the combined bearing-means and damping-means at the other portion of the spindle, the driven mass being the larger, that the principal natural frequencies of vibration of the resilient system are fairly constant throughout a considerable range of variation in the mass of the driven mass, said principal natural frequencies of vibration having a range of values which is well below the operating-speed of the assembly.

12. The invention as defined in claim 9, characterized by the driven mass comprising a non-varying portion which is the same under all normal operating-conditions of the rotating assembly and a variable portion which varies as to mass and the degree of unbalance under different operating-conditions of the assembly, and further characterized by such interrelations between the flexibility of the spindle and the inertia characteristics of the driven mass and the combined bearing-means and damping-means at the other portion of the spindle, the driven mass being the larger, that the natural frequency involving the angular movement of the spindle about its second portion is fairly constant throughout a considerable range of variation in the effective inertia of the driven mass and is well below the operating-speed of the assembly.

13. A rotating assembly comprising a flexible spindle having means, near one end, for the attachment of a driven mass to be rotated, a rotor-member for applying a driving-torque to the assembly, bearing-means for said rotor-member, a supporting-frame for supporting said bearing-means, a spindle-driving and guiding means for the driving-attachment of one portion of the rotor-member to a second portion of the spindle with some freedom of tilting movement of the spindle but with substantial restraint against radial lateral-translation of the spindle at said second portion thereof, and a combined bearing-means and damping-means, surrounding some other portion of the spindle, for permitting the spindle to rotate with some freedom of lateral displacement, but damping such lateral displacement, at said other portion of the spindle.

14. The invention as defined in claim 13, characterized by the driven mass comprising a non-varying portion which is the same under all normal operating-conditions of the rotating assembly and a variable portion which varies as to mass and the degree of unbalance under different operating-conditions of the assembly, and further characterized by such interrelations between the effective masses and inertias of the driven mass under all operating conditions, the effective mass of the combined bearing-means and damping-means at the other portion of the spindle, the distances of these masses from the second portion of the spindle, and the flexibility of the spindle, that the natural frequency involving mainly angular motion of the driven mass, the natural frequency involving mainly translation of the driven mass, and the natural frequency involving mainly angular motion of the spindle, moving substantially about said second portion of the spindle, are all well below the operating-speed of the rotating assembly.

15. The invention as defined in claim 13, characterized by the driven mass comprising a non-varying portion which is the same under all normal operating-conditions of the rotating assembly and a variable portion which varies as to mass and the degree of unbalance under different operating-conditions of the assembly, and further characterized by such interrelations between the flexibility of the spindle and the inertia characteristics of the driven mass and the combined bearing-means and damping-means at the other portion of the spindle, the driven mass being the larger, that the principal natural frequencies of vibration of the resilient system are fairly constant throughout a considerable range of variation in the mass of the driven mass, said principal natural frequencies of vibration having a range of values which is well below the operating-speed of the assembly.

16. The invention as defined in claim 13, characterized by the driven mass comprising a non-varying portion which is the same under all normal operating-conditions of the rotating assembly and a variable portion which varies as to mass and the degree of unbalance under different operating-conditions of the assembly, and further characterized by such interrelations between the flexibility of the spindle and the inertia characteristics of the combined bearing-means and damping-means at the other portion of the spindle, the driven mass being the larger, that the natural frequency involving the angular movement of the spindle about its second portion is fairly constant throughout a considerable range of variation in the effective inertia of the driven mass and is well below the operating-speed of the assembly.

FRANK C. RUSHING.